Oct. 15, 1935.  J. L. ANDERSON  2,017,430
CIRCLE CUTTING OR WELDING MACHINE
Filed Oct. 10, 1933  2 Sheets-Sheet 1

INVENTOR
James L. Anderson
BY
*signature*
ATTORNEY

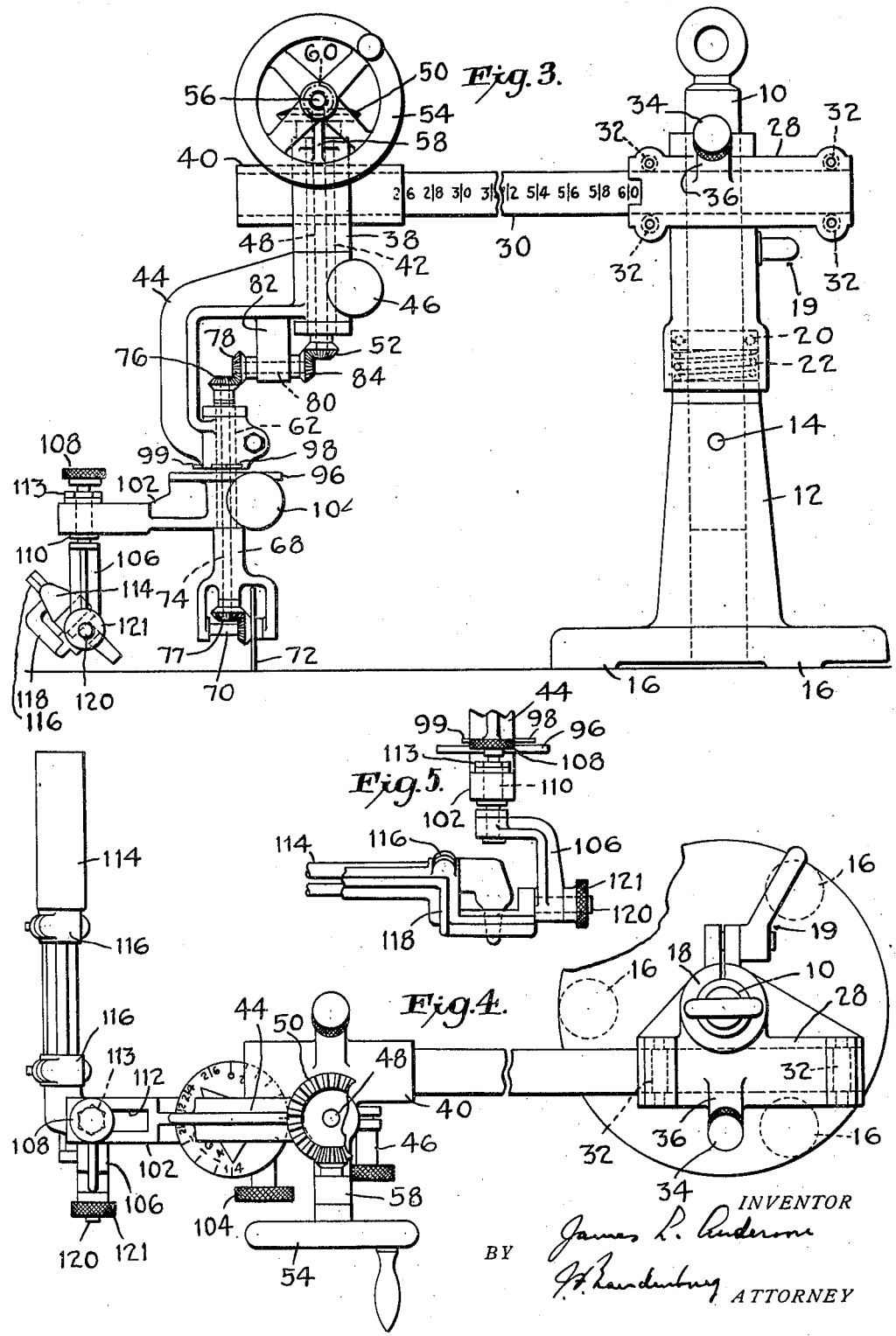

Patented Oct. 15, 1935

2,017,430

UNITED STATES PATENT OFFICE 2,017,430

CIRCLE CUTTING OR WELDING MACHINE

James L. Anderson, Closter, N. J., assignor to Air Reduction Company, Incorporated, New York, N. Y., a corporation of New York Application October 10, 1933, Serial No. 692,971

13 Claims. (Cl. 266—23)

This invention relates to machines for making circular cuts or welds with a gas cutting or welding torch.

An object of the invention is to provide a circle cutting or welding machine which will cut or weld circles of any desired radius from zero to a maximum value which depends on the size of the machine. The invention obtains the widest possible range of radii for a given size of machine.

Another object is to provide a torch machine for cutting or welding circles around a center post or standard with special provision for moving the torch to cut or weld circles of smaller diameter than the center post or standard.

Other objects are to provide for cutting a bevel edge in either direction, and for vertical floating movement of the radius arm in a circle cutting machine of the character indicated.

The invention comprises novel features and combinations of elements which make the machine of small size in proportion to its cutting range, economical to manufacture and convenient to use.

Other features, objects and advantages will appear or be pointed out as the description proceeds.

In the accompanying drawings, forming part hereof:

Fig. 3 is a side elevation of a circle cutting machine similar to that shown in Fig. 1, but with modified torch supporting means which enable the machine to cut either perpendicular or bevel edges;

Fig. 4 is a top plan view of the machine shown in Fig. 3; and

Fig. 5 is a fragmentary end view of the torch supporting means shown in Figs. 3 and 4.

Figure 1:
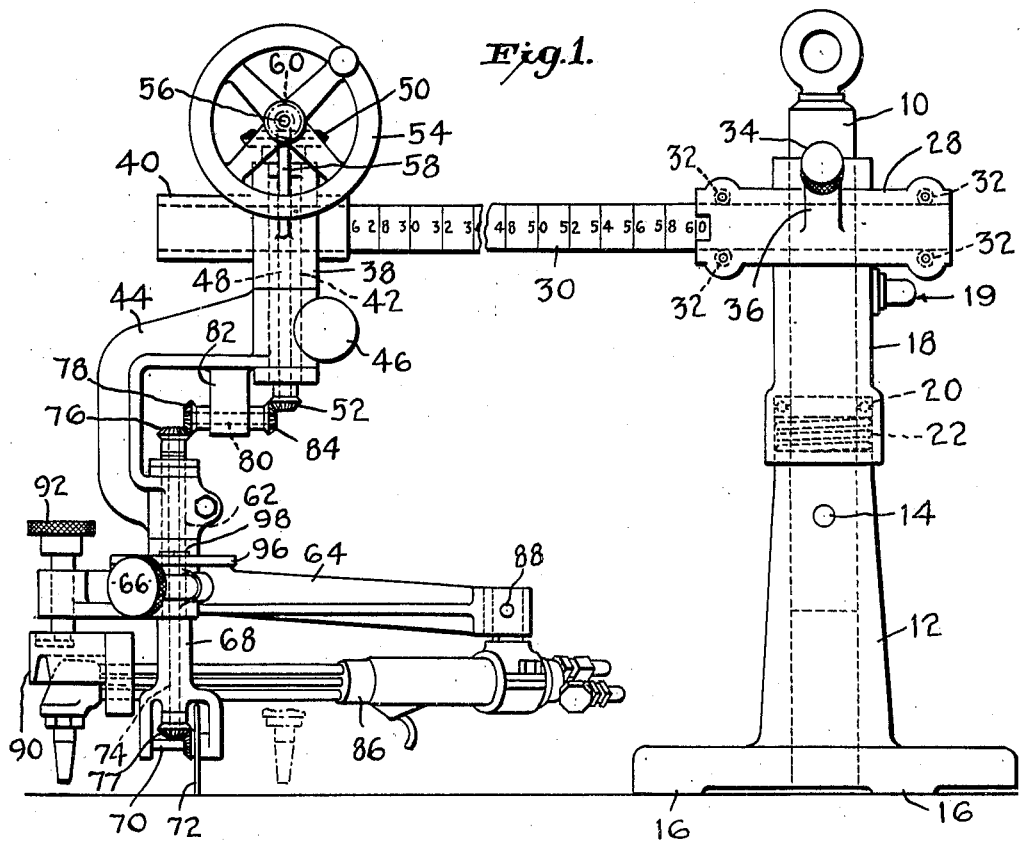
Fig. 1 is a side elevation of a circle cutting machine embodying this invention.
Figure 2:
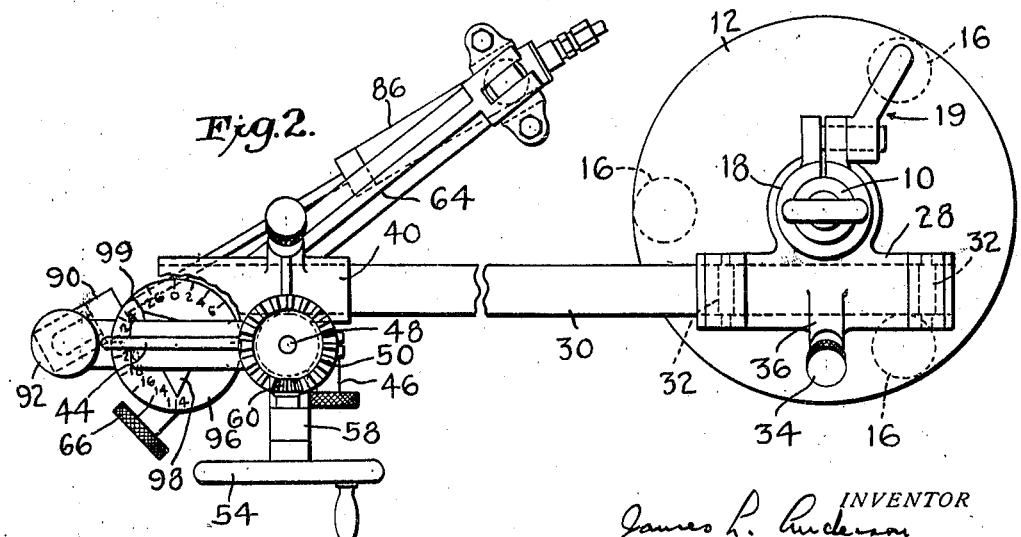
Fig. 2 is a top plan view of the circle cutting machine shown in Fig. 1.

A center post or standard 10 has its lower end extending into a base 12, to which it is fastened by a pin 14. The base 12 has three legs 16 for supporting it stably on any surface. A frame 18 has a long vertical bearing which fits the center post 10. This frame is a split clamp and has clamping means 19 which can be tightened to hold the frame against movement on the center post. When the clamping means 19 is released, the frame 18 slides and turns freely on the center post. An anti-friction thrust bearing 20 rests on a spring 22 and supports the frame 18. The spring is supported by the base 12 and the bottom end of the frame 18 is shaped to cover the thrust bearing 20 and spring 22 as a shroud.

The frame 18 has a horizontal portion 28 for supporting a radius arm 30. This arm is of square cross-section and slides in the horizontal portion 28 of the frame. One side of the radius arm is graduated and has numerals for indicating the radius of the circle which the machine will cut when the respective graduations are even with the end of the horizontal portion 28 of the frame.

Rollers 32 journaled in the horizontal portion 28 of the frame serve as anti-friction bearing members when the radius arm 30 is moved lengthwise to set the machine to cut a different radius. A clamping screw 34 threads through a boss 36 on the frame 18 and can be screwed down to clamp the radius arm 30 in any set position.

A vertical bearing 38 is supported by a clamp 40 secured to the end of the radius arm 30. A sleeve 42 is rigidly held in the vertical bearing 38 and extends below the end of this bearing. An arm 44 has its upper end formed as a split clamp which fits over the extending end of the sleeve 42 and can be clamped on this sleeve by a screw 46. When the screw 46 is released, the arm 44 turns freely on the sleeve 42 as a bearing.

A shaft 48 extends through the sleeve 42 and has bevel gears 50 and 52 on its upper and lower ends, respectively. These bevel gears at the opposite ends of the shaft 48 and their collars hold the arm 44, sleeve 42, shaft 48, and vertical bearing 38 in assembled relation.

A hand wheel 54 is connected to one end of a shaft 56, which turns in a bracket 58 at the top of the vertical bearing 38. A bevel gear 60 on the other end of the shaft 56 meshes with the bevel gear 50 at the upper end of the shaft 48.

A sleeve 62 is rigidly held in the lower end of the arm 44. The sleeve 62 extends below the arm 44, and torch holder 64 fits over this extending end of the sleeve 62. The torch holder 64 turns on the sleeve 62 except when clamped against turning by a screw 66.

A driving wheel holder 68 is integral with or rigidly connected to the sleeve 62 and has a yoke end holding an axle 70 of a driving wheel 72. A shaft 74 extends through the sleeve 62 and driving wheel holder 68 and has bevel gears 76 and 77 secured to its upper and lower ends.

The bevel gear 77 meshes with a similar gear connected to the driving wheel 72 and the bevel gear 76 meshes with a gear 78 at one end of a cross shaft 80. This cross shaft turns in a lug 82 dependent from the upper part of the arm 44. A gear 84 on the other end of the cross shaft 80 meshes with the bevel gear 52.

A torch 86 is pivotally connected at one end to the torch holder 64 by a pin 88. The tip end of the torch is supported by a block 90. A screw 92 threads through the torch holder 64 and has a collar at its lower end in an undercut slot in the block 90 for supporting this block 90 and the tip end of the torch. The torch tip is moved toward and from the work by turning the screw 92.

The distance from the cutting jet of the torch 86 to the point of traction of the driving wheel 72 is equal to the distance between the axes of the shafts 48 and 74. It is therefore possible to turn the torch holder 64 about the sleeve 62 until the tip of the torch 86 comes into line with the axis of the shaft 48. The torch tip is shown in broken lines in such a position in Fig. 1.

If the radius rod 30 is held stationary, the clamping screw 46 released, and the hand wheel 54 operated to rotate the mechanism about the axis of the shaft 48 as a center while the torch tip is located on this center line, it is evident that the cutting jet delivered by the torch does not move and the radius of the circle cut is equal to zero.

With the torch 86 in the full-line position shown in Fig. 1, the tip is at its maximum distance from the axis of shaft 48, and if the arm 44 is rotated about the axis of the shaft 48 the torch cuts a circle with a radius equal to the distance between the axis of the shaft 48 and the cutting jet of the torch tip when in this full-line position.

A graduated disc 96 is secured to the torch holder and moves through an angle of 180° with respect to a pointer 98 while the torch holder moves the torch tip from the dotted to the full-line position shown in Fig. 1. The pointer 98 is secured to the lower end of the arm 44, and numerals on the disc 96 indicate the radius of the circle which the torch will cut when the torch holder is clamped to the sleeve 62 and rotated about the axis of the shaft 48.

Fourteen inches is the maximum radius which the machine shown in Fig. 1 can cut when rotating the torch about the axis of the shaft 48 as a center.

For cutting circles between fourteen and twenty-six inches, the torch holder 64 is clamped to the sleeve 62, the arm 44 is clamped to the sleeve 42, and the arm 30 is rotated around the center post 10. The radius arm 30 is moved lengthwise to bring the clamp 40 into contact with the horizontal portion 28 of the frame 18. A pointer 99 secured to the lower end of the arm 44 is used with a set of numerals ranging from fourteen to twenty-six. When the numeral twenty-six is in line with the pointer 99, and the clamp 40 is against the horizontal portion 28 of the frame, the torch cuts a circle of twenty-six inch radius about the center post 10. If the torch holder is turned on the sleeve 62 to bring the torch tip closer to the center post the radius is reduced, the numeral in line with the pointer 99 indicating the radius of the circle for the various positions of the torch holder.

When cutting circles of larger radius than twenty-six inches, the torch holder is set in the twenty-six inch position, and the radius arm 30 is moved lengthwise to locate the torch tip at a distance from the axis of the center post equal to the radius of the circle to be cut. The radius rod 30 has numerals on its side and the numeral at the end of the horizontal portion 28 of the frame indicates the radius which the machine is set to cut. A part of the edge of this horizontal portion 28 is cut back to make the numerals visible. The machine shown in Fig. 1 is set to cut a circle with a radius of sixty inches, the largest circle which can be cut with this machine.

Fig. 3 shows a modified form of the invention for making circular cuts with beveled edges. The machine is similar to Fig. 1 as far as the torch holder and the parts are indicated by the same reference characters. An arm 102 is clamped on the lower end of the sleeve 62 by a clamping screw 104.

A torch holder bracket 106 has a screw 108 threaded through a clamping bushing 110. This clamping bushing extends through a slot 112 in the arm 102 and can be moved along the slot to change the position of the torch holder bracket. The clamping bushing has a shoulder at its lower end and a nut 113 threaded over its upper end for clamping it in any set position along the slot 112. The screw 108 is used to lower and raise the torch holder bracket.

A torch 114 is held by clamps 116 of a torch holder 118. This torch holder is connected to the torch holder bracket 106 by a bolt 120 and nut 121. When the nut 121 is tight, the torch holder bracket and torch holder are rigidly connected. The torch holder can be turned about the axis of the bolt 120 to bring the torch tip into a sloping position for making bevel cuts. The movement of the end of the torch tip forward or from the axis of rotation when the tip is brought into a sloping position can be compensated for by shifting the clamping bushing 110 in the opposite direction along the slot 112.

The operation of the machine is as follows:

Circles from zero to fourteen inches in radius are cut by operating the clamping means 19 to clamp the frame 18 on the center post, releasing the clamping screw 46, clamping the torch holder 64 on the sleeve 62, and then turning the hand wheel 50 which rotates the driving wheel 72 and causes the torch to move in a circle about the axis of the shaft 48 as a center. The radius of the circle cut is indicated by the numeral on the disc 96 in line with the pointer 98.

Since the frame 18 is clamped on the center post 10 when cutting circles having a radius between zero and fourteen inches, there is no floating movement of the frame when cutting these small radius circles.

After cutting a circular opening about the axis of the shaft 48, the mechanism can be moved to cut another circular opening in another part of the work by releasing the clamping means 19 and moving the arm 30 until the axis of the shaft 48 is in line with the center of the new opening to be cut. By turning the frame 18 and arm 30 through a given angle after each cut, a circle of circular openings can be cut around the center post or standard.

When cutting circles between fourteen and twenty-six inches in diameter, the clamping means 19 is released, the clamp 40 moved in against the end of the horizontal portion 28 of the frame, the arm 44 clamped to the sleeve 42 by the clamping screw 46, and the hand wheel 54 turned to operate the driving wheel 72 and rotate the torch and other structure around the center post 10. As the driving wheel moves up and down with undulations of the work the torch is moved in a similar manner and the frame 18 moves with a vertical floating movement on the center post 10.

When cutting circles of any diameter, the driving wheel is always close to the torch tip so that the driving force is applied near the cutting jet. In addition to the floating movement described, this application of the driving power close to the point where the cutting operation is in progress insures more steady motion and permits continual control of the torch by the operator.

When cutting around the center post 10 with the clamp 40 against the end of the horizontal portion 28 of the frame 18, the numeral on the disc 96 in line with the pointer 99 indicates the radius of the circle cut.

Circles having a radius larger than twenty-six inches can be cut by setting the torch holder so that the numeral 26 registers with the pointer 99, and moving the radius arm 30 to bring the numeral which corresponds to the radius to be cut even with the end of the horizontal portion 28 of the frame. The radius arm 30 is clamped in this position by the screw 34, the clamping means 19 is released, the clamping screw 46 tightened, and the hand wheel 54 rotated to operate the driving wheel 72.

The invention is designed for cutting but a welding torch can be substituted for the cutting torch to make circular welds, and other changes and modifications may be made, and various features of the invention may be used along or in combination with other features, without departing from the invention defined in the claims.

I claim:

1. A circle cutting or welding machine including a center post; a radius arm connected to the center post; a torch holder; a connection between the torch holder and the radius arm; means for causing the radius arm to rotate about the center post so that the torch holder describes a circle around the center post; and means for causing the torch holder to describe a circle around another axis when the radius arm is stationary.

2. In a torch cutting or welding machine, a fixed standard; a radius arm connected with the standard for rotation around said standard as a center; a driving wheel connected with the radius arm near one end of the arm; a torch holder supported by the driving wheel; mechanism for operating the driving wheel to move the torch holder in a circle around the standard; and means for causing the driving wheel to rotate the torch holder around another center including means for holding the radius arm against rotation on the standard.

3. In a torch cutting or welding machine, a fixed standard; a radius arm connected with the standard for rotation around said standard as a center; a torch holder connected to the radius arm for rotary movement about a second center remote from the standard; a driving wheel; a clamp for preventing movement of the torch holder about said second center so that the driving wheel will rotate the torch holder and radius arm around the standard as a center; and another clamp for preventing movement of the radius arm about the standard so that the driving wheel will rotate the torch holder about said second center.

4. A torch cutting or welding machine comprising a standard, a radius arm connected with the standard for rotation around the standard as a center, a torch holder, means connecting the torch holder with the radius arm for rotation around another center remote from the axis about which the radius arm rotates, releasable holding means for preventing rotation of the radius arm around the standard, other releasable holding means for preventing rotation of the torch holder around the other center, and common driving mechanism for causing the torch holder to rotate with the radius arm around the standard as a center or around the other center depending upon which of said holding means is in operative position.

5. A circle cutting or welding machine, including a torch holder; driving mechanism including a wheel for running on the work to move the torch holder so that the tip of a torch supported by the holder describes a circle; and means for setting the torch holder in different positions with respect to the driving means to describe a circle of any desired radius between zero and a maximum determined by the size of the cutting machine.

6. In a circle cutting or welding machine, an arm; a driving wheel for running on the work to rotate the arm about an axis; a torch holder movably connected to the arm for supporting a cutting torch; and means for setting the torch holder in different positions with respect to the arm for locating the tip of the torch on the axis of rotation or at various distances from the axis to cut circles of any desired radius between zero and a given maximum, the driving wheel being located substantially midway between the zero and maximum radii positions of the torch tip.

7. A circle cutting or welding machine comprising a driving wheel supported by the work; a torch holder and a connecting arm supported by the driving wheel and increasing the traction of said wheel; an overhanging arm; a pivot connection between said arms; hand-operated mechanism for rotating the driving wheel to move the torch holder and connecting arm about the axis of the pivot connection as a center; and means for setting the torch holder to locate a torch tip in line with said axis or at various distances from the axis to cut circles of any diameter between zero and a given maximum.

8. A circle cutting or welding machine comprising an arm, means supporting the arm for rotation about a fixed axis, a torch holder pivotally connected with the arm for rotation about another axis to change the distance of a torch tip from said fixed axis of rotation, said torch holder being of such length that in one angular position the torch tip is substantially in line with said fixed axis of rotation, and releasable means for holding the torch holder in any set position about its pivot connection with the arm so that it rotates as a unit with said arm about the fixed axis.

9. In a circle cutting or welding machine, an arm supported for rotation around a fixed axis normal to the work; a torch holder supported by the arm and rotatable on the arm about an axis parallel to said fixed axis to change the distance between a torch tip and the fixed axis; means for pivotally connecting a torch to the holder; a screw for moving the torch on its pivot connection to regulate the spacing of the torch tip from the work; and a clamp for preventing movement of the torch holder with respect to the supporting arm so that the torch holder and arm move as a unit about the fixed axis as a center.

10. A circle cutting or welding machine including an arm rotatable about a fixed axis; a torch holder; a pivot connection between the arm and torch holder; a torch carried by the torch holder with the torch tip spaced from the axis of the pivot connection so that said tip moves toward or from the fixed axis when the torch holder is turned on its pivot connection; a graduated disc and pointer, one of which is fixed to the torch holder and the other to the arm for indicating the position of the torch tip with respect to the fixed axis; and releasable means for preventing movement of the torch holder on its pivot connection.

11. A circle cutting or welding machine including a supporting arm rotatable about a fixed axis; a torch holder arm; a pivot connection between the supporting arm and torch holder arm; a bracket carried by the torch holder arm for supporting a torch with its tip spaced from the axis of the pivot connection by a distance equal to that between the axis of the pivot connection and the fixed axis; means for moving the bracket to set the torch to make a bevel cut; and connections between the torch holder and bracket for moving the bracket closer or further from the axis of the pivot connection to keep the cutting jet at the same distance from the axis of the pivot connection when the torch is tipped to make a bevel cut.

12. A circle cutting or welding machine including a supporting arm rotatable about a fixed axis; a torch holder arm; a pivot connection between the supporting arm and torch holder arm; a torch carried by the torch holder arm with the torch tip spaced from the axis of the pivot connection so that said tip moves toward or from the fixed axis when the torch holder is turned on its pivot connection; and means for tilting the torch to make bevel cuts sloping to either side of the vertical.

13. A circle cutting or welding machine comprising an arm, means supporting the arm for rotation about a fixed axis, and means for connecting a cutting or welding torch with said arm including a torch holder and a pivot connection on which the torch holder rotates to move the torch tip along an arc, one point of which is substantially in line with said fixed axis so that the torch can be set to cut or weld circles of any diameter between zero and a maximum value dependent on the size of the machine.

JAMES L. ANDERSON.